(12) United States Patent
Abreu et al.

(10) Patent No.: US 10,956,916 B1
(45) Date of Patent: Mar. 23, 2021

(54) SELF LEARNING MACHINE LEARNING PIPELINE FOR ENABLING IDENTITY VERIFICATION

(71) Applicant: Socure, Inc., New York, NY (US)

(72) Inventors: Pablo Ysrrael Abreu, New York, NY (US); Ali Haddad, New York, NY (US); Elliot John Hughes, New York, NY (US); Vijin K. P. Parambath, New York, NY (US)

(73) Assignee: Socure, Inc., New York, NY (US)

( * ) Notice: Subject to any disclaimer, the term of this patent is extended or adjusted under 35 U.S.C. 154(b) by 0 days.

(21) Appl. No.: 17/026,845

(22) Filed: Sep. 21, 2020

(51) Int. Cl.
| | | |
|---|---|---|
| *G06Q 10/10* | (2012.01) | |
| *G06Q 30/02* | (2012.01) | |
| *G06Q 40/08* | (2012.01) | |
| *G06Q 10/08* | (2012.01) | |
| *G06Q 30/00* | (2012.01) | |
| *G06F 9/54* | (2006.01) | |
| *G06Q 20/40* | (2012.01) | |
| *G06F 16/28* | (2019.01) | |
| *G06Q 50/26* | (2012.01) | |
| *G06N 20/00* | (2019.01) | |

(52) U.S. Cl.
CPC ......... *G06Q 30/0185* (2013.01); *G06F 9/541* (2013.01); *G06F 16/285* (2019.01); *G06N 20/00* (2019.01); *G06Q 20/4014* (2013.01); *G06Q 50/265* (2013.01)

(58) Field of Classification Search
CPC ............ G06Q 30/0185; G06Q 50/265; G06Q 20/3674; G06Q 20/02; G06Q 20/3274; G06Q 20/3276; G06Q 20/40145; G06Q 20/4014; G06F 9/541; G06F 16/285; G06F 21/32; G06F 21/6245; G06F 21/36; G06K 19/06037; G06N 20/00
USPC .................................. 705/1.1–912, 318, 325
See application file for complete search history.

(56) References Cited

U.S. PATENT DOCUMENTS

| | | | | |
|---|---|---|---|---|
| 7,686,214 | B1* | 3/2010 | Shao ................... | G06Q 20/382 235/380 |
| 9,686,275 | B2* | 6/2017 | Chari .................. | H04L 63/0861 |
| 10,257,181 | B1* | 4/2019 | Sherif .................. | G06F 21/316 |
| 10,581,851 | B1* | 3/2020 | File ..................... | G06K 9/6224 |
| 2010/0049987 | A1* | 2/2010 | Ettorre ............... | H04L 63/0861 713/186 |
| 2010/0293094 | A1* | 11/2010 | Kolkowitz ........... | G06Q 20/401 705/44 |
| 2011/0035788 | A1* | 2/2011 | White .................. | H04L 9/3231 726/4 |

(Continued)

*Primary Examiner* — Jonathan P Ouellette
(74) *Attorney, Agent, or Firm* — Charles B. Lobsenz; Brian H. Buck; Potomac Law Group, PLLC

(57) ABSTRACT

The system and methodology of the present invention employs novel machine learning techniques in order to periodically update and supplement a set of identity verification databases used in connection with KYC determinations. The system and methodology of the present invention periodically receives updated identity data from third-party sources and may also use customer logic input provided to update the model used in making KYC determinations. The system of the present invention further updates and optimizes the identity verification databases and selectively deploys them in a production environment without requiring any human intervention, such that identity verification is incrementally improved over time as more identity data is provided to the system.

14 Claims, 10 Drawing Sheets

(56) References Cited

U.S. PATENT DOCUMENTS

| | | | |
|---|---|---|---|
| 2011/0047040 A1* | 2/2011 | Carlson | G06Q 20/385 |
| | | | 705/26.1 |
| 2011/0211735 A1* | 9/2011 | Langley | G06K 9/6807 |
| | | | 382/115 |
| 2017/0032277 A1* | 2/2017 | Klinger | G06N 20/00 |
| 2018/0316665 A1* | 11/2018 | Caldera | H04L 63/104 |
| 2019/0042887 A1* | 2/2019 | Nguyen | G06N 20/00 |
| 2019/0342276 A1* | 11/2019 | Sherif | G06F 21/316 |

* cited by examiner

```
{
  "referenceId": "fc1f83e7-2554-4ba8-8fe9-a8224148d2e7",   ← Unique Identifier
  "kyc": {
    "reasonCodes": [                                         ← All 900 reason codes correspond to KYC information.
      "R919",
      "R913",
      "R903"
    ],
    "fieldValidations": {                                    ← Field Validations: Two possible values, 0.99 represents input elements have been found and elements correlated to the identity. The value of 0.01 means that the input elements have not been matched.
      "firstName": 0.99,
      "surName": 0.99,
      "streetAddress": 0.99,
      "city": 0.99,
      "state": 0.99,
      "zip": 0.99,
      "mobileNumber": 0.01,
      "dob": 0.99,
      "ssn": 0.99
    }
  }
}
```

FIG. 3

| recordID | firstname | lastname | mobilenumber | dob | streetaddress | city | state | zip | ssn | email |
|---|---|---|---|---|---|---|---|---|---|---|
| 1 | robert | smith | 17035541214 | 19781211 | 123 Main Street | New York | NY | 11222 | | rsmith@email.com |
| 2 | bob | smith | 17035541214 | 19781112 | 1515 Adela Lane | Boston | MA | 2101 | | bobsmith@email.com |
| 3 | Robert | Smith | 17035541214 | 19781211 | 132 E Main St | Manhattan | NY | 11222 | 112233 | rsmith@email.com |
| 4 | Patricia | Jones | 13232237054 | | Apple Berry Street | Los Angeles | CA | 90292 | 123456789 | pattyjones@email.com |
| 5 | kim | Jones | 17029191601 | 197812 | | | | | | |
| 6 | Robert | Smith | | 19670821 | 1515 Adela Lane | Boston | MA | 2101 | | |
| 7 | Andrea | Doe | | 19670822 | 1515 Adela Lane | San Francisco | CA | 90000 | 872189761 | |
| 8 | A. | Doe | 17035541214 | | 1515 Adela Lane | San Francisco | CA | 90000 | 89761 | |
| 9 | Rob | Smith | | 197812 | 123 Main Street | New York | NY | 11222 | | |
| 10 | patty | Jones | 17029191600 | | Apple Berry Street | Marina Del Rey | CA | 90292 | | |

FIG. 5a

| recordID.1 | recordID.2 | FIRSTNAME | LASTNAME | MOBILENUMBER | DOB | EMAIL | SSN | ADDRESS |
|---|---|---|---|---|---|---|---|---|
| 1 | 3 | EXACT MATCH | EXACT MATCH | EXACT MATCH | EXACT MATCH | EXACT MATCH | NA | STREET & ZIP & STATE |
| 1 | 9 | Partial | EXACT MATCH | NA | Year Month Match | NA | NA | EXACT MATCH |
| 2 | 6 | NickName | EXACT MATCH | NA | Year Match | NA | NA | EXACT MATCH |
| 3 | 9 | Partial | EXACT MATCH | NA | Year Month Match | NA | NA | STREET & ZIP & STATE |
| 7 | 8 | Initial | EXACT MATCH | NA | 1-Edit | NA | last 5 | EXACT MATCH |

| recordID.1 | recordID.2 | MATCHING PROB |
|---|---|---|
| 1 | 3 | .99 |
| 1 | 9 | .95 |
| 2 | 6 | .9 |
| 3 | 9 | .8 |
| 7 | 8 | .8 |

FIG. 5c

| Identity Cluster | Corresponding recordID (Probability >=0.95) |
|---|---|
| A | 1, 3, 9 |
| B | 2 |
| C | 7 |
| D | 8 |

FIG. 5d

```
identity_A = {
    "firstname": ["robert", "rob"],
    "lastname": ["smith"],
    "mobilenumber": ["17035s412"],
    "dob":["19781211", "197812"],
    "streetaddress": ["123 Main Street","132 E Main St"],
    "city":["New York"],
    "state": ["NY"],
    "zip": ["11222"],
    "ssn": ["112233"],
    "email":["r.smith@email.com","rsmith@email.com"]
}
```

FIG. 5e

Automated Validation Test

| | | | |
|---|---|---|---|
| KYC.firstname | 91.93% | 92.40% | 0.46% |
| KYC.surname | 95.38% | 95.70% | 0.32% |
| KYC.ssn | 87.51% | 88.07% | 0.56% |
| KYC.dob | 88.42% | 88.76% | 0.34% |
| KYC.mobilenumber | 37.02% | 37.53% | 0.51% |
| KYC.streetaddress | 70.06% | 72.85% | 2.79% |
| KYC.city | 86.10% | 87.10% | 0.99% |
| KYC.zip | 81.08% | 82.62% | 1.74% |
| KYC.state | 95.00% | 95.26% | 0.26% |
| I903 | 0.06% | 0.06% | 0.00% |
| I904 | 0.49% | 0.49% | 0.00% |
| I906 | 0.12% | 0.12% | 0.00% |
| R901 | 12.02% | 4.39% | -7.63% |
| R907 | 0.62% | 0.61% | -0.01% |
| R909 | 0.17% | 0.17% | 0.00% |
| R911 | 1.50% | 1.50% | 0.00% |
| R913 | 0.11% | 0.05% | -0.06% |
| R932 | 0.01% | 0.01% | 0.00% |
| R947 | 0.75% | 0.75% | -0.01% |
| I909 | 0.12% | 0.12% | 0.00% |
| R922 | 11.45% | 11.12% | -0.33% |
| R933 | 5.40% | 5.34% | -0.06% |
| R934 | 5.61% | 5.57% | -0.05% |
| R940 | 7.59% | 7.08% | -0.51% |
| R953 | 0.00% | 0.00% | 0.00% |
| R954 | 0.09% | 0.09% | 0.00% |
| I911 | 0.15% | 0.15% | 0.00% |
| R916 | 2.11% | 2.11% | 0.00% |
| R963 | 0.26% | 0.26% | 0.00% |
| R964 | 3.00% | 3.03% | 0.03% |
| R972 | 0.22% | 0.22% | 0.00% |
| R973 | 0.02% | 0.02% | 0.00% |
| R941 | 4.64% | 4.89% | 0.25% |
| R955 | 0.99% | 1.25% | 0.26% |
| R956 | 1.45% | 1.46% | 0.01% |
| R957 | 1.56% | 1.34% | -0.22% |
| R928 | 6.92% | 7.22% | 0.30% |
| R939 | 1.27% | 1.26% | -0.01% |
| I912 | 4.15% | 4.15% | 0.00% |

FIG. 6

SELF LEARNING MACHINE LEARNING PIPELINE FOR ENABLING IDENTITY VERIFICATION

FIELD OF THE INVENTION

The present invention is directed generally to systems and methodologies associated with enabling identity verification and more particularly to systems and methodologies which employ machine learning to enhance the systems and models for verifying the identity of users attempting to engage in various transactions.

BACKGROUND OF THE INVENTION

In today's business environment, almost all businesses have an online presence. A great majority of these businesses permit their customers to conduct transactions online. These transactions almost always involve either a financial component or otherwise require a trust-based element. For example, when a customer purchases a good or service, it is critical to determine that the person (or machine) initiating and conducting the transaction is who they say they are. This identity verification is required to ensure that the form of payment (e.g. credit card) is authorized for use by the purported purchaser. If the purchaser cannot be verified, then a variety of undesirable results can occur, such as chargebacks and other revenue losses.

Even when there is no financial component to a transaction, negative consequences can still result if one of the participants is not who they say they are. For example, businesses may offer other types of online services which provide access to data, access to sensitive systems or resources or the ability to conduct non-financial transactions impacting the operation of the business. It is necessary to do whatever is possible to ensure that the person, entity or machine seeking to conduct these types of interactions are who they say they are and that their purported activity is not fraudulent.

Various fraud detection and identity verification methodologies and related systems for implementing the same exist. While these offerings are generally helpful and effective, there exists a need for novel approaches to the problem of verifying identities and preventing fraud in connection with online activities.

In connection with identity verification in particular, various regulatory schemes exist under which transaction processors and other regulated entities must comply with specific requirements associated with potential transactions. One such regulatory framework is often referred to as know your customer (KYC). The KYC requirements dictate that financial institutions must verify consumer identities before allowing potential customers to engage in most financial transactions. These policies and requirements have generally been expanding both in the United States and globally. They are designed to address corruption, terrorist financing, money laundering and various other financial crimes.

KYC policies and requirements have become an important tool for financial institutions to prevent illegal transactions and to perform identity verification. Typically, KYC procedures require the financial institution to collect some basic personal information about their customer such as name, social security number, date of birth and/or residential address. Once this data is collected, it can be compared against lists of individuals known for corruption, individuals subject to sanctions and individuals known to be at high risk for committing financial crimes. In addition, the submitted data can be checked for internal consistency between its various elements. Based on these checks and others, the financial institution can then apply its own risk assessment metrics to the results to determine if the customer should be permitted to establish a relationship with the company and/or if a specific transaction should proceed.

In traditional approaches to identity verification, static databases are employed for the assessment of online transactions. However, these approaches suffer from a number of drawbacks. For one, the data sets that make up the model require frequent updates to remain effective. In a static database system, these updates may require manual intervention as updated data arrives, and there is often a lag between the time that new data is required and the time that it is implemented to make KYC decisions. This lag often results in undesirable outcomes, such as inaccurate and error-prone identity verification results which drive bad decision making in terms of which transactions are permitted and which are not.

Financial institutions generally make money when they bring in new customers who process legitimate transactions. Therefore, financial institutions want to limit as much as possible, rejections of customers who really are who they say they are. This is commonly termed false-positive declines. Outdated databases are a leading cause of these false positives.

Similarly, false negative declines—cases in which an institution fails to prohibit a customer that does not satisfy KYC from transacting, are a significant problem. In addition to false negatives subjecting an institution to potentially fraudulent transactions, they may even cause the institution to be punished for running afoul of the regulatory framework.

Yet another concern associated with current identity verification systems is the impact that they can have on the user experience. In some cases, the process can slow down the transaction and/or add additional confusion for the customer. This can result in abandonment of the transaction and possibly loss of revenue and/or other negative impacts to the customer relationship specifically and/or the business in general. Online merchants and other businesses which conduct and offer online transactions are seeking a seamless experience where identity verification activities occur in the background and are essentially invisible to the user.

Due to the inherent operational characteristics of existing systems, both false positives and false negatives occur at an undesirable rate. This results in preventing transactions that should be permitted to occur and permitting transactions to occur when they should not be permitted. Both situations harm businesses and their customer relations.

SUMMARY OF THE INVENTION

A primary objective of the invention disclosed herein is a system and methodology which addresses the drawbacks of the prior art by employing novel machine learning techniques in order to periodically update and supplement a set of identity verification databases that underlie KYC determinations. The system and methodology of the present invention periodically receives updated identity data from third-party sources and uses customer logic input to update the model used in making KYC determinations. The system of the present invention further updates and optimizes the identity verification databases and selectively deploys them in a production environment, without requiring any human intervention, such that identity verification is incrementally improved over time as more identity data and customer logic input is provided to the system.

While the present invention is described in the context of making identity verification decisions based on the likelihood of an individual attempting to engage with a company actually being who they say they are, the invention is not necessarily limited thereto. Rather, the teachings of the present invention can also be applied in any cases where it is desirable to use an identity determination to provide guidance in selectively allowing, rejecting or restricting online transactions.

Another object of the present invention is to provide a system which allows KYC determinations to be made based on known identity data as well as identity clusters derived from that data. Over time, and as new known identity data and customer feedback is provided to the system and new identity clusters are developed based thereupon, the system becomes iteratively more accurate in providing data to assist customers in making identity verification decisions. Because machine learning is employed, much of the human involvement which was required in prior art systems can be eliminated or reduced.

The system and methodology of the present invention operate, in one embodiment, to provide a cloud-based application through which an external system can make calls/requests, such as through APIs or other machine-to-machine protocols, for scoring data for KYC determinations based on information provided in connection with the calls/requests. In preferred embodiments, the information provided to the system of the present invention when calls are made may include personal information which may include the user's name, physical address, social security number, date of birth and/or other information. Also, in preferred embodiments, the system of the present invention returns a series of identity verification scores which are used by the calling system to make an identity verification decision, such as whether or not to permit the opening of a new credit card account. Reason codes may also be returned to the calling system. These reason codes further quantify the basis for the identity verification scores generated by the system of the present invention as more fully described herein.

In preferred embodiments of the present invention, the identity verification scores are derived from the mapping of the received identity data as against the identity clusters generated by the system of the present invention. The calling system can then use the identity verification scores to make a KYC decision based upon criteria that have been predetermined through the configuration of the calling system. In some cases, manual human intervention may be used to make or assist in making the identity verification decision. The determination as to whether human intervention is needed can be based on a number of factors including the identity verification scores, the type of transaction being attempted and/or various aspects of the data associated with the individual or entity attempting the transaction, as such data is known to either or both of the system of the present invention and/or the calling system.

The system and methodologies of the present invention also periodically receive feedback data from some or all of the calling systems, with respect to each of the prior KYC requests. In preferred embodiments, this includes whether or not the transaction was authorized or valid.

In preferred embodiments, the machine learning pipeline of the present invention triggers automatically when a new data file is received from a third-party vendor. These files are made available to the system of the present invention at varying times and at different frequencies. Upon receipt of these files, the system preferably operates to standardize and normalize the file format so that it is consistent with other files used by the system. In addition, these files are compared with previously received files to ensure consistency. After this, file cleanup is performed as well as additional data-quality checks.

Verification model development is an ongoing process as updated and new data files are received from time to time. Data records are clustered using the set of available data in the data files such that identity data associated with each identity is grouped together to assist in verification determinations. As new clusters of identity are generated, these new clusters are compared against the active version of the identity clusters to assess whether or not performance has improved. The new clusters are moved to replace the active version only when a threshold improvement is made. This generally requires that the auto approvals (which reflect automated identity verification by transacting entities without human intervention) for customer KYC inquiries are determined by established statistical measures to be improved as against the previous active model as determined by established statistical measures.

When KYC queries are received from calling systems, the system of the present invention will then perform data transformation, as more fully described herein, including through the use of various natural language processing techniques, to ensure that the queries are formatted in a manner allowing the machine learning algorithms access to the data, so as to make KYC determinations according to the teachings herein. The data associated with the queries is then mapped against the active version of the identity cluster model. The resulting outcome of this mapping is a set of scores associated with each aspect of the queried data, reflecting the likelihood of an identity verification match. These scores, along with a set of reason codes reflecting the basis for the determination, are then returned to the querying system, which then uses the data to make an identity verification determination either automatically or with manual human intervention, or via some combination of both.

BRIEF DESCRIPTION OF THE DRAWINGS

FIG. 3 is a view of an exemplary data set associated with an identity verification request response provided to a client in one embodiment of the present invention;

FIGS. 5a-5e are a set of diagrams depicting various exemplary data sets generated by and used by the system of the present invention in constructing identity clustering models according to the teachings of the present invention; and FIG. 6 is an exemplary set of data used by the system of the present invention to assess whether an updated clustering model should be substituted for the current active model according to the teachings of the present invention according to a preferred embodiment thereof.

DETAILED DESCRIPTION OF THE INVENTION

Figure 1:
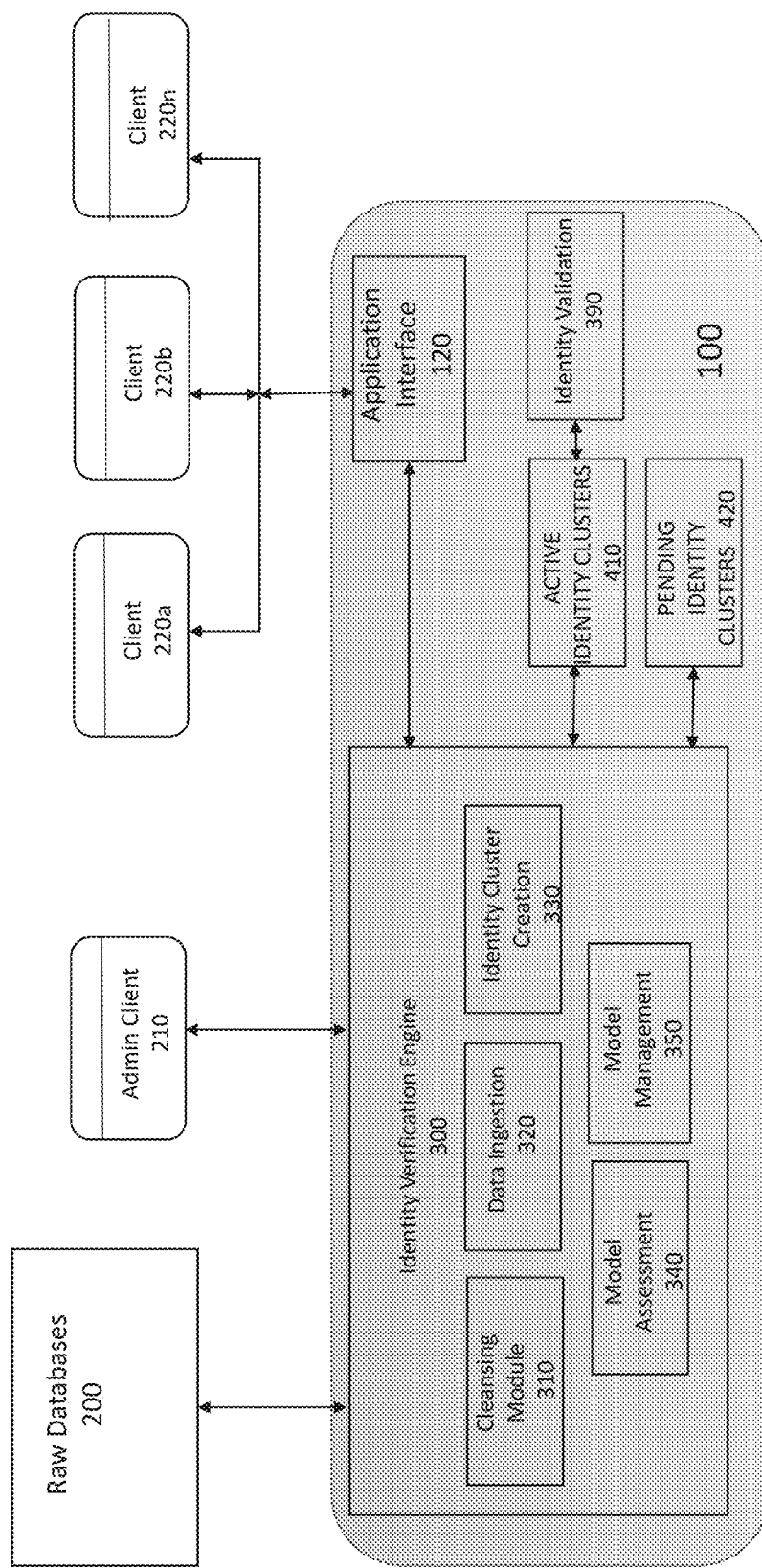
FIG. 1 is a diagram depicting the major components of the system of the present invention, including various elements with which the system of the present invention may interact, in preferred embodiments thereof.

The present disclosure will now be described in terms of various exemplary embodiments. This specification discloses one or more embodiments that incorporate features of the present embodiments. The embodiment(s) described, and references in the specification to "one embodiment", "an embodiment", "an example embodiment", etc., indicate that the embodiment(s) described may include a particular feature, structure or characteristic. Such phrases are not necessarily referring to the same embodiment. The skilled artisan will appreciate that a particular feature, structure or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present embodiments. Thus, the present embodiments can be carried out in a variety of ways and do not require any of the specific features described herein. Also, well-known functions or constructions are not described in detail since they would obscure the present embodiments with unnecessary detail.

The description is not to be taken in a limiting sense but is made merely for the purpose of illustrating the general principles of the present embodiments, since the scope of the present embodiments are best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions herein should be understood to control over dictionary definitions, definitions in documents incorporated by reference, and/or ordinary meanings of the defined terms.

The indefinite articles "a" and "an," as used herein and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

With reference now to FIG. 1, the system of the present invention, in one preferred embodiment thereof, is now described. According to this preferred embodiment, identity verification scoring system (IVSS) 100 resides on a single cloud-based server, although it is also possible for various components of IVSS 100 (as described herein) to reside on separate servers. By way of example, IVSS 100 may be a computer-implemented application which resides on a computing server.

IVSS 100 preferably includes an identity verification engine (IVE) 300, which itself is comprised of a number of modules as discussed further herein. IVE 300 operates to generate scores associated with identity verification determinations based on received input. These scores are generated in response to requests originating from clients 220a, 220b, . . . 220n. IVSS 100 may be accessed through the internet, or any other private or public network, by one or more clients 220.

Each of clients 220 may be personal computers, laptops, handheld computing devices (such as smartphones or tablets) or any other device capable of providing the required connectivity and display. In some embodiments, client 220 may be a computing application operated by a customer which requires identity verification guidance to process transaction requests. For example, client 220 may be an application or set of applications operated by a financial institution which processes requests for new account openings and/or for new credit cards made by customers of that financial institution.

Clients 220 interact with IVSS 100 such that data may be communicated between them via application interface 120 and such that IVSS 100 may process identity verification score requests made by clients 220. Application interface 120 may comprise one or more application programming interfaces (APIs) that permit applications associated with client 220 to communicate with IVSS 100.

Also shown in FIG. 1 is admin client 210. Admin client 210 may comprise personal computers, laptops, handheld computing devices (such as smartphones or tablets) or any other similar device. Admin client 210 functions to allow users to configure, maintain and support the operation of IVSS 100. For example, a user may use admin client 210 to interact with IVSS 100 to set parameters regarding what is required to invoke the transition from an active identity cluster model to a replacement active cluster model, as discussed in further detail below.

Raw databases 200 may also be present according to the teachings of the present invention. Raw databases 200 may comprise one or more external databases, data sets, systems, applications, rules bases and/or other sources of data which are used by IVSS 100 to generate identity verification scores and/or to generate and/or update the cluster model used by IVSS 100 as further described herein. By way of example, raw databases 200 may comprise credit reporting databases, demographic databases, reported and known fraud data, financial transaction data, physical address data, phone data, credit inquiry data, date-of-birth information, utility data and marketing data as well as other sources of data useful to IVSS 100 in updating the identity cluster models according to the teaching of the present invention. More details on the types of data and related databases which may be available to IVSS 100 are provided below. As noted above, and in preferred embodiments, raw databases 200 may be third-party applications which periodically provide identity related data to IVE 300 for updating cluster models. This data may be in formats and frequencies as may be determined by the third-party vendors, the operator of IVSS or both.

Returning now to the specific components of IVSS 100, IVSS 100 may include various components for generating scores which are used to make a binary decision on identity verification. In one embodiment, these components may include application interface 120 (described above), active identity clusters 410, pending identity clusters 420 and the various components of IVE 300. Each of these components and their associated functionality are more fully described below.

IVSS 100 may reside on one or more physical servers. These servers may include electronic storage, one or more processors, and/or other components. The servers may also include communication lines or ports to enable the exchange of information with a network and/or other computing platforms. The servers may include a plurality of hardware, software and/or firmware components operating together to provide the functionality attributed herein to IVSS 100.

Electronic storage associated with the servers may comprise non-transitory storage media that electronically stores information. The electronic storage media of electronic storage may include system storage that is provided integrally (i.e., substantially non-removable) with servers and/or removable storage that is removably connectable to the servers via, for example, a port or drive.

Electronic storage may include one or more of optically readable storage media (e.g., optical disks, etc.), magnetically readable storage media (e.g., magnetic tape, magnetic hard drive, floppy drive, etc.), electrical-charge-based storage media (e.g., EEPROM, RAM, etc.), solid-state storage media (e.g., flash drive, etc.) and/or other electronically readable storage media. Electronic storage may include one or more virtual storage resources (e.g., cloud storage, a virtual private network and/or other virtual storage resources). Electronic storage may store software algorithms, information determined by processors, information received from servers, information received from clients 220 and/or other information that enables the servers to function as described herein.

While an exemplary architecture is described above, it will readily be understood by one of skill in the art that an unlimited number of architectures and computing environments are possible while still remaining within the scope and spirit of the present invention.

Returning now to the specific components of IVSS 100 shown in FIG. 1, IVE 300 includes various modules which are now generally described. The operation of each of these modules will be described in further detail below. In a preferred embodiment of the present invention, cleansing module 310 performs two unique functions. First, it cleanses identity data received from raw databases 200 such that the applicable identity data is normalized and placed in a format that the system can use to construct and update the identity cluster model from time to time. Second, cleansing module 310 functions to process queries from clients 220 such that variations in data format and classification can be normalized for processing as client requests for identity verification scoring are received. While only one pending identity clusters model 420 is shown in FIG. 1, in practice multiple pending identity cluster models 420 may exist as feedback data is received from various clients 220 and as new information from raw databases 200 is received.

Data ingestion module 320 is activated when new data is available from raw databases 200. Following cleansing and normalization of the data, the new data is made available for updating the identity clusters as further described below. As noted above, the data available to IVSS 100 may include various types of data which are used to develop and improve the identity clusters which are, in turn, used when identity verification calls are received, so as to generate scores reflecting the likelihood that the information provided in connection with the call represents a valid identity. The data ingested from raw databases 200 may include, for example, phone number data, physical address data, date-of-birth data, data associated with credit inquiries, utility data and marketing data.

Following ingestion of newly available and cleansed data, as described above, identity cluster creation module 330 updates pending identity clusters 420 to create one or more new identity cluster models, reflecting the updated identity data received from raw databases 200. This updated model is optimized to provide clustering which is incrementally more accurate, in terms of matching against data supplied with identity verification requests as received by IVSS 100. In preferred embodiments of the present invention, model optimization results in more accurate clustering models but also in an enhanced auto-approval rate if possible, as that is desired by customers in order to increase revenue opportunities. More details about the operation of identity cluster creation model 330 as well as the process for generating identity verification models according to the teachings of the present invention are provided below.

Once a new pending identity cluster model is developed, model assessment module 340 then assesses the newly developed model resulting from identity cluster creation 330. In a preferred embodiment this assessment comprises comparing the newly developed pending identity clusters 420 against the currently in-use active identity clusters model 410 to determine whether the pending identity clusters model 420 is statistically significantly improved over the current active identity clusters model 410. This preferably includes, in at least one embodiment, an enhanced rate of auto approvals compared to the existing model.

Assuming that the pending identity cluster model 420 is incrementally better in terms of auto-approval rates, for example, then model management module 350 operates to substitute the pending identity cluster model 420 for the current identity cluster model 410, after which model management module 350 will initiate one or more new pending identity cluster models 420 associated with the new active model 410 so that additional data can be employed to continually update and optimize the relevant model as new data is received over time. Model management module 350 may also function to alert the relevant client(s) 220 concerning a newly rolled-out active model 410 as well as provide any information and/or documentation which is required or useful in connection with client's use of the updated model. In some embodiments, this information may also include new or different information regarding the type and/or format of data which is required and/or desired in connection with client's use of the new model.

Also shown in FIG. 1 is Identity Validation Module (IVM) 390. IVM 390 functions to process personally identifiable information (PII) data received from clients 220 and, using active identity clusters 410, generate scores associated with specific data fields indicative of whether such fields are likely to represent valid identification data. These identity verification scores may also, in some embodiments of the present invention, be supplemented with one or more reason codes indicative of the rationale for the assigned identity verification scores, as more fully described below.

Figure 2:
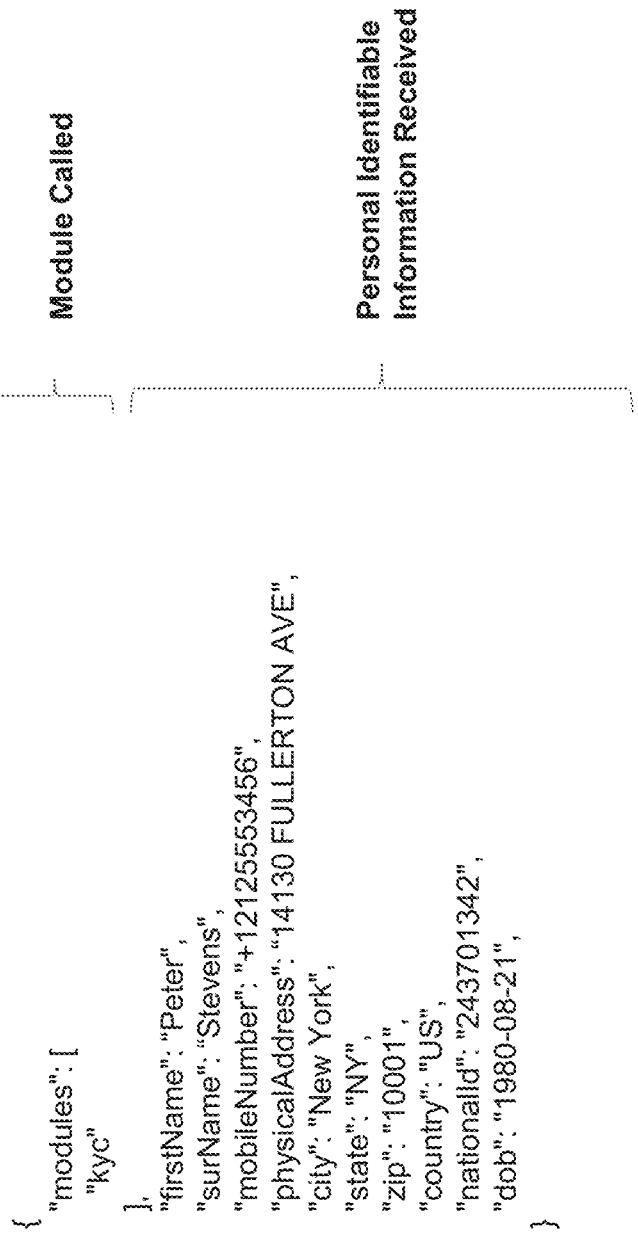
FIG. 2 is a view of an exemplary data set associated with an identity verification request call received from a client in one embodiment of the present invention.

With reference now to FIGS. 2 and 3, exemplary call data and returned identity verification scores, respectively, in one embodiment of the present invention, is provided. FIG. 2 shows exemplary data that may be provided by client 220 to IVSS 100 in connection with a request for identity verification presented as one or more identity verification scores. In preferred embodiments, the format of these calls is specified via application interface 120 and client 220 is configured to provide data in this required format. In this example, the name, mobile phone number, physical address, national ID and date of birth are all passed to IVSS 100 by client 220 in connection with the identity verification request. This personally identifiable information is used by IVSS 100 to generate identity verification scores using the clustering models available to it and as further discussed below.

FIG. 3 is an exemplary set of data returned to client 220 by IVSS 100 following the completion of the identity verification scoring process which is invoked by the client request. The identity validation module 390 queries the input data against the active identity clusters 410 and calculates the identity verification scores and reason codes based on the query results. The complexities of the scoring algorithms and reason code logics can be tuned to suit the needs of the client. In this case, a reference ID is assigned to the request response. This reference ID may also be used in connection with feedback information provided by the calling system. When feedback data is later reported to include those transactions which were ultimately made using false identity information, this reference ID value is used to match the reported feedback data with the data generated and used by IVSS 100 in originally conducting the identity verification score analysis such that the clustering model can be optimized to reflect the incorrect determination.

In preferred embodiments, the data returned by IVSS 100 to client 220 also includes a series of identity verification scores indicative of the likelihood that each of the data fields supplied by the calling system represents incorrect data. In some embodiments, the scores for each field (identity verification scores) are either 0.99, representing a likely match, or 0.01, representing a likely mismatch. In some embodiments, the returned data may also include one or more reason codes which reflect the justification for the identity scores as well as providing other information associated with various risk factors. For example, the reason codes shown in FIG. 3 may represent the following results: R919—"Address cannot be resolved to the individual"; R913—"SSN/ITIN is invalid"; and R903—"DOB cannot be resolved to the individual".

In most cases and in preferred embodiments of the present invention, the calling system uses the information returned to it to make an identity verification decision. In some cases, an auto approval may be generated. In other cases, the data set returned may cause the calling system to notify personnel that a manual review may be required (for example, if there are values of 0.01 for one or more identity verification scores or if specific reason codes are returned).

Figure 4:
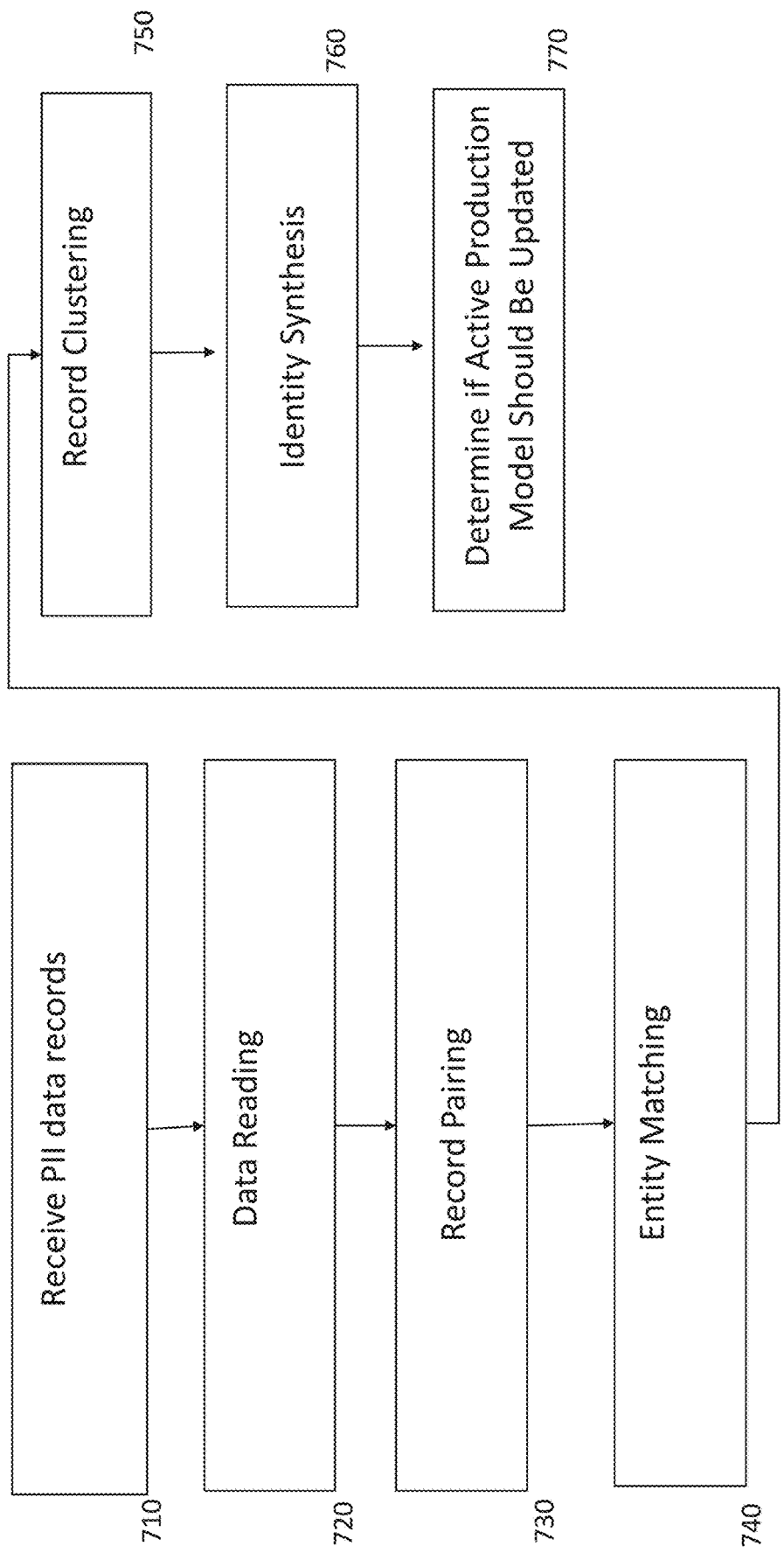
FIG. 4 is a flow chart describing the key steps involved in the process of performing identity synthesis to create updated clustering models using machine-learning-based rules optimization according to the teachings of the present invention in preferred embodiments thereof.

Turning now to FIG. 4, a flowchart describing the steps in the process of optimizing cluster models using newly acquired raw data according to the teachings of the present invention, is provided. In connection with this discussion, FIGS. 5a-5e are also provided. These figures are to be referenced in connection with a discussion using exemplary PII data to illustrate the processing of this data to perform identity synthesis according to the unique and novel aspects of the present invention.

This process encompasses what is also referred to herein as "identity synthesis", and once identity synthesis is complete a new pending identity cluster model 420 is available. According to the teachings of the present invention, additional steps, as described herein, are also undertaken to determine whether the newly created identity cluster model 420 performs better than the current active identity cluster model 410 such that the current active identity cluster model 410 should be replaced with the newly created identity cluster model 420.

The discussion that follows is an exemplary process for ingesting new data received from raw databases 300, or from some other source, to optimize a cluster model which is later used when an identity verification request is received. In this discussion it is assumed that a single new data file is received from a source associated with raw databases 300 and, further, that the new data is used to update a single pending identity cluster model 420 which may potentially replace one or more active identity cluster models 410. As will be understood by one of skill in the art, the scope and spirit of the present invention is not necessarily limited thereto. For example, and as referenced above, more than one data set may be received at one time and these multiple data sets may be applied to optimize one or more cluster models.

With reference now to FIG. 4, the first step in the process, step 710, is the receipt of new PII data records either from raw databases 300 or from some other source. This new data is processed as now described such that identity synthesis is performed and at least one new pending cluster model 420 is thus created. At step 720, data reading is performed. The data reading step 720 involves the conversion of data records into a list of record profiles as shown in FIG. 5a. In connection with this step, each record represents a uniquely identified set of name-value pairs. The system of the present invention is able to receive data sets from different sources and in different formats (e.g. CSV, XML, JSON, database tables etc.) and process them to generate a data structure such as shown in FIG. 5a, by way of example.

As can be seen in FIG. 5a, data is ordered in a plurality of rows, each assigned a record ID and containing as much information associated with that record ID as is available from the data source. In one embodiment, as represented by FIG. 5a, the data fields include the following: first name, surname, mobile phone number, date of birth, street address, city, state, zip, social security number and email address.

Figure 5B:
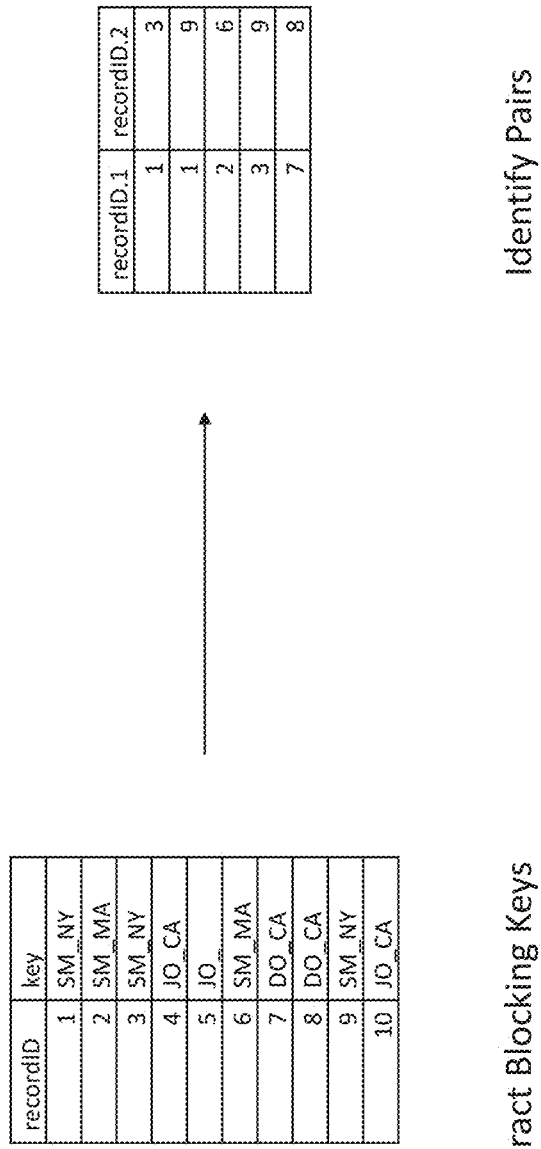

The next step in the process of identity synthesis, step 730, is record pairing. At this point, identity verification engine 300 and, in particular, identity cluster creation module 330, function to cluster the records into possibly overlapping blocks. These blocks are automatically generated by identity cluster creation module 330. With reference now to FIG. 5b, it can be seen that blocking keys are extracted from the data structure in FIG. 5a to generate the left table in FIG. 5b (extract blocking keys). By way of example, this table is generated by using a two-letter prefix on surname and state (noting that in preferred embodiments several keys are used to improve the results). So, for record ID 1, the generated key is "SM_NY", representing the first two letters of the surname "Smith" and the state of residence associated with that record ID.

Once a block is defined (e.g. by a concatenation of tokens from different record IDs such as the first three letters of the surname concatenated with the year of birth), system 100 constructs record pairs by taking all 2-combinations of records within each block. This is illustrated in the table at the right in FIG. 5b (identify pairs). In this case, we have record pairs 1-3, 1-9, 2-6, 3-9 and 7-8 based on the shared blocking keys for those records.

The processing next proceeds to a record matching step 740. This step is discussed in connection with the tables included in FIG. 5c. In this step, identity cluster creation module 330 compares the records in each pair and assigns a similarity score ranging between 0 and 1 to every pair. Referencing the top table in FIG. 5c, it can be seen that a row is created for each matched pair, determined in the previous step. The matched pairs are assessed for matching on an element-by-element basis. As can be seen, in some cases an exact match is found, and in other cases partial matches are found. If a data element for one of the paired records is missing, an "NA" is assigned. Other possibilities also exist in connection with the matching values and determinations and one of ordinary skill in the art will recognize that the scope of the present invention is not limited to the specific matching assessment protocol discussed above or as shown in FIG. 5c.

Entity matching step 740 continues by taking the data generated in the top table of FIG. 5c and computing a matching probability for each record pair based on the matching assessment just performed. By way of example, and with reference to the data in the tables, it can be seen that the system has computed a matching probability of 0.99 for record IDs 1 and 3. Matching probabilities, in preferred embodiments, may be determined using a machine-learning-implemented probabilistic model. In alternative embodiments, this can be based, by way of example, upon the number of exact matches for the various fields in the record. By contrast, the 7-8 pair is assigned a lower matching probability due to less-exact matches and additional "NA"s, representing that the data match confidence is not as high as that of the 1-3 record pairing.

Record clustering step 750 performs record clustering as will now be described in connection with FIG. 5d. During this step, identity cluster creation module 330 takes as input the similarity graph resulting from the record matching step 740 and, as shown as the bottom table in FIG. 5c, partitions it into a set of equivalence clusters, with every cluster corresponding to a distinct real-world entity. Assuming an example where only linkages with matching probabilities at or above 0.95 are used for grouping, the table in FIG. 5d can be generated. As can be seen, the linkages between records 1, 3 and 9 meet this criterion (forming identity cluster A), and thus other identity clusters (B, C and D) comprise only single records.

The next and final step of the identity synthesis process is identity synthesis step 760. Consistent with the name of this step, the resulting output is a plurality of identity clusters that can be used later for identity verification processing when requests for the same are received by IVSS 100. An example of one identity cluster which is generated upon completion of identity synthesis step 760 is shown in FIG. 5e. As can be seen, by way of example, FIG. 5e shows an identity cluster "A" which represents an enriched identity which combines data aspects from each of record ID 1, record ID 3 and record ID 9. The applicable attributes are shown in FIG. 5e. A set of such identity clusters is generated as part of the data ingestion process and the resulting set is stored as a new pending identity cluster 420.

Next, at step 770 (active cluster model determination), and now that a new 1s pending identity cluster model 420 has been created, the expected performance of this cluster model is measured against the known and expected performance of the active model 410. This function is performed by model assessment module 340 by running identity verification queries on known data, using both models and checking outcomes reflected as percentages of matches achieved with both the active and the pending models. With reference to FIG. 6, it can be seen that active data is matched against the pending model data to determine a difference (delta) between the performance of the two models. It is preferred that higher matching percentages on the KYC fields are obtained, while it is also preferred that lower percentages of reason codes are obtained. Based on the deltas achieved with respect to these outputs, the system of the present invention makes a determination as to what extent there is improved performance with the pending model.

If it is determined that performance of the pending model 420 is not statistically significantly better than the performance of the active model 410, then no change in active model is made. Rather, IVSS 100 continues to receive more data from raw databases 300 and the model is continually updated over time until such time as the performance of the development pending model 420 is statistically significantly better than the performance of the active model 410.

Once this happens, IVSS 100, under the control of model management module 350, will substitute the new pending model as the new active model. This step may also include automatically notifying one or more customers via clients 220 of the update to the model as well as providing any information that customers should know about the new model and/or updates to the required format for providing feedback data.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims.

What is claimed is:

1. A system configured to generate identity verification results, comprising:
    a physical storage capability and one or more processors for executing instructions implementing each of
    a data ingester to receive raw identity data from at least one source of raw identity data and process said raw identity data to generate processed identity data;
    an active identity cluster database contained within said physical storage capability, said active identity cluster database comprising a first model comprising a plurality of first clusters of first processed identity data of said processed identity data,
    an identity verifier to generate identity verification scores through the matching of said plurality of first clusters as against personal information data, said personal information data comprising identifying information associated with an individual person;
    an identity cluster creator to receive second processed identity data of said processed identity data, and to generate, directly in response to receiving said second processed identity data, a pending identity cluster database comprising a second model comprising a plurality of second clusters of said second processed identity data; and
    a model manager to substitute said pending identity cluster database for said active identity cluster database, in response to a determination by said model manager that said pending identity cluster database performs statistically significantly better than said active identity cluster database when comparing matching of said respective first and second clusters as against said personal information data.

2. The system of claim 1 wherein said identity verification scores are binary variables and said identity verification scores are employed to make a decision regarding said identity verification in connection with a proposed transaction.

3. The system of claim 1 wherein said first model is further operative to generate reason codes said reason codes reflecting a reason associated with one of said identity verification scores.

4. The system of claim 1 wherein said identity verification scores are provided to an external transaction system, said external transaction system employing said identity verification scores to make binary identity verification determinations.

5. The system of claim 1 wherein at least one request for identity verification along with said personal information data is received from an external client via an application programming interface (API) and wherein said system returns at least one of said identity verification scores to said external client, said at least one identity verification score indicative of whether a field value associated with said personal information data matches with a field value associated with one of said first clusters contained within said first model.

6. The system of claim 1 wherein said system is resident on a computer server and wherein said system communicates with one or more clients via an application programming interface (API).

7. The system of claim 6 wherein said clients generate identity verification requests and wherein said system communicates at least one of said identity verification scores to said clients.

8. The system of claim 1 wherein said personal information data comprises information associated with an individual seeking to effect a transaction.

9. A computer-implemented method of generating identity verification results, the method being implemented in a computer system comprising one or more processors configured to execute instructions stored on a non-transient computer-readable medium, the method comprising executing one or more of said instructions for:
    receiving identity data, said identity data comprising identifying information associated with individual persons;
    generating a first identity cluster database, said first identity cluster database comprising a first model comprising a plurality of first clusters of said identity data;
    receiving, from at least one client, personal information data associated with an individual person;
    generating identity verification scores through the matching of said first clusters as against said personal information data; and
    transmitting said identity verification scores to said at least one client;
    receiving additional identity data;
    generating, directly in response to receiving said additional identity data, a second identity cluster database comprising a second model comprising a plurality of second clusters of said additional identity data;
    determining whether the performance of said second model is statistically significantly better than the performance of said first model when comparing matching of said respective first and second clusters as against said personal information data; and
    in response to performance of said second model being statistically significantly better than the performance of said first model, then substituting said second model for said first model.

10. The method of claim 9 wherein said identity verification scores are binary variables and said identity verification scores are employed to make a decision regarding identity verification in connection with a proposed transaction.

11. The method of claim 9 wherein said first model is further operative to generate reason codes, said reason codes reflecting a reason associated with one of said identity verification score.

12. The method of claim 9 wherein said identity verification scores are provided to an external transaction system, said external transaction system employing said identity verification scores to make binary identity verification determinations.

13. The method of claim 9 wherein at least one request for identity verification along with said personal information data is received from an external client via an application programming interface (API) and wherein at least one of said identity verification scores is returned to said external client, said at least one identity verification score indicative of whether afield value associated with said personal information data matches with a field value associated with one of said first clusters contained within said first model.

14. The method of claim 9 wherein said personal information data comprises information associated with an individual seeking to effect a transaction.

* * * * *